(12) United States Patent
Huang

(10) Patent No.: US 11,994,497 B2
(45) Date of Patent: May 28, 2024

(54) TESTING DEVICE

(71) Applicant: HUIZHOU CHINA STAR OPTOELECTRONICS DISPLAY CO., LTD., Guangdong (CN)

(72) Inventor: Yichun Huang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 0 days.

(21) Appl. No.: 17/622,842

(22) PCT Filed: Dec. 22, 2021

(86) PCT No.: PCT/CN2021/140616
§ 371 (c)(1),
(2) Date: Dec. 26, 2021

(87) PCT Pub. No.: WO2023/108774
PCT Pub. Date: Jun. 22, 2023

(65) Prior Publication Data
US 2024/0035940 A1    Feb. 1, 2024

(30) Foreign Application Priority Data

Dec. 14, 2021 (CN) .......................... 202111526434.1

(51) Int. Cl.
*G01N 3/04*     (2006.01)
*G01N 3/20*     (2006.01)

(52) U.S. Cl.
CPC ................ *G01N 3/04* (2013.01); *G01N 3/20* (2013.01); *G01N 2203/0023* (2013.01);
(Continued)

(58) Field of Classification Search
CPC .... G01N 3/04; G01N 3/20; G01N 2203/0023; G01N 2203/0037; G01N 2203/0075; G01N 2203/047
See application file for complete search history.

(56) References Cited

U.S. PATENT DOCUMENTS 5,955,680 A        9/1999   Yoshizawa
11,187,634 B2 *   11/2021   Cheng ...................... G01N 3/20
(Continued)

FOREIGN PATENT DOCUMENTS

CA        2625190 A1 *   4/2007
CN        204421817 U     6/2015
(Continued)

OTHER PUBLICATIONS

Chinese Office Action issued in corresponding Chinese Patent Application No. 202111526434.1 dated Oct. 11, 2023, pp. 1-9.
(Continued)

*Primary Examiner* — Ryan D Walsh
(74) *Attorney, Agent, or Firm* — PV IP PC; Wei Te Chung; Zhigang Ma

(57) ABSTRACT

The present application provides a testing device. The testing device includes: a box, a pressing mechanism, a sliding mechanism, a transmission mechanism, and first clamping mechanisms. The pressing mechanism is located inside the box. A gap between the pressing mechanism and the first side of the box is used to place substrates to be tested. The pressing mechanism is slidably connected to the sliding mechanism. The transmission mechanism is connected to the pressing mechanism to drive the pressing mechanism to move. Each first clamping mechanism is used to hold one of the substrates to be tested.

20 Claims, 4 Drawing Sheets

(52) U.S. Cl.
CPC ............... *G01N 2203/0037* (2013.01); *G01N 2203/0075* (2013.01); *G01N 2203/047* (2013.01)

(56) References Cited

U.S. PATENT DOCUMENTS

| | | | |
|---|---|---|---|
| 2011/0248739 A1* | 10/2011 | Kim | G01M 5/005 324/762.01 |
| 2016/0103048 A1 | 4/2016 | Okazaki et al. | |
| 2019/0154555 A1* | 5/2019 | Han | G01N 3/04 |

FOREIGN PATENT DOCUMENTS

| | | | |
|---|---|---|---|
| CN | 107014700 A | | 8/2017 |
| CN | 108106948 A | | 6/2018 |
| CN | 109490096 A | | 3/2019 |
| CN | 110398424 A | | 11/2019 |
| CN | 110715847 A | * | 1/2020 |
| CN | 111766134 A | | 10/2020 |
| CN | 113567276 A | | 10/2021 |

OTHER PUBLICATIONS

International Search Report in International application No. PCT/CN2021/140616, dated Aug. 25, 2022.
Written Opinion of the International Search Authority in International application No. PCT/CN2021/140616, dated Aug. 25, 2022.

* cited by examiner

TESTING DEVICE

FIELD OF DISCLOSURE

The present application relates to a field of display technology and in particular, to a testing device.

DESCRIPTION OF RELATED ART

At present, display products with small curvature surface technology have a risk of product fragmentation during production. A main reason which leads to fragmentation is because strength of the display panel decreases over time. In order to prevent the risk of fragmentation of the display panel, it is necessary to analyze reliability based on material parameters of the display panel and test the strength and an effective lifespan of the display panel.

However, when performing stress fragmentation tests on substrates to be tested, conventional test equipment cannot adapt to substrates of different sizes, cannot perform batch testing on the substrates to be tested, and cannot perform equal bending on multiple panels to be tested at the same time to obtain a stepped stress of the substrates to be tested. As a result, it is difficult to perform a reliability test on the strength and effective lifespan of the display panel.

Therefore, there is an urgent need to provide a testing device which can solve the above technical problems.

Conventional testing devices cannot accurately measure material parameters of curved products.

SUMMARY

The present application provides a testing device, for testing material parameters of a plurality of substrates to be tested, wherein the testing device comprises: a box, a pressing mechanism, a sliding mechanism, a transmission mechanism, and a plurality of first clamping mechanisms. The box comprises a base. The pressing mechanism is disposed inside the box. A gap between the pressing mechanism and a first side of the box is configured for placing the plurality of substrates to be tested. The sliding mechanism is arranged on the base. The pressing mechanism is slidably connected to the sliding mechanism. The transmission mechanism is connected to the pressing mechanism to drive movement of the pressing mechanism. Each of the first clamping mechanisms comprises a first clamping member and a second clamping member disposed opposite to the first clamping member. Each first clamping member is located on the first side of the box, each second clamping member is located on the pressing mechanism, each first clamping member is configured to hold a first end of one of the substrates to be tested, and each second clamping member is configured to hold a second end of one of the substrates to be tested.

The pressing mechanism is driven by the transmission mechanism through a screw rod.

The above-mentioned testing device clamps the substrates to be tested simultaneously through the first clamping mechanisms. At the same time, the pressing mechanism is movably connected to the transmission mechanism, so that the pressing mechanism slides on the sliding mechanism and can simultaneously press and bend the substrates to be tested, thereby being able to adjust arch heights of the substrates to be tested, achieve equal and stable deformation of the substrates to be tested. The pressing mechanism is driven by the transmission mechanism through a screw rod.

Such a design can increase a transmission ratio of the testing device, realizing a more compact structure of the testing device.

In the testing device according to one embodiment of the present application, each first clamping member and each second clamping member are both an L-shaped curved side clip, and a convex direction of a curved surface of the L-shaped curved side clip is opposite to a bending direction of a panel to be tested.

Such configuration can effectively reduce a contact surface stress between the first clamping member and the substrate to be tested.

In the testing device according to one embodiment of the present application, a curvature of the curved surface of each L-shaped curved side clip is greater than a curvature of the corresponding substrate to be tested.

Such configuration can prevent one end of the substrate contacting the L-shaped curved side clamp from detaching due to excessive bending angles.

In the testing device according to one embodiment of the present application, the base is welded with a first support column close to the first side of the box, and the base is welded with a second support column close to a second side of the box, a first cross beam is disposed at a top of the base, and the first support column and the second support column are fixedly connected to the first cross beam;

wherein the base is further welded with a third support column, the third support column is arranged between the first support column and the second support column, and the third support column is fixedly connected to the first cross beam.

Such an arrangement can effectively improve structural stability of the testing device.

In the testing device according to one embodiment of the present application, a fixing frame is disposed between the second side of the box and the pressing mechanism, a first end of the sliding mechanism is fixed on the fixing frame, and a second end of the sliding mechanism penetrates the pressing mechanism and is fixed on the third support column.

Such an arrangement can fix the two ends of the sliding mechanism onto the box and avoid a displacement error of the pressing mechanism during a sliding process.

In the testing device according to one embodiment of the present application, the sliding mechanism comprises a sliding rail and a sliding rod, the sliding rail is fixed on the base, and the sliding rod is fixed on the sliding rail and exposes a track of the sliding rail.

Such an arrangement can improve stability of the pressing mechanism during the sliding process.

In the testing device according to one embodiment of the present application, the pressing mechanism comprises a second clamping mechanism and a third clamping mechanism, the second clamping mechanism is disposed on the sliding rail, the second clamping mechanism holds the sliding rod, two ends of the second clamping mechanism are engaged with the track of the sliding rail, and the third clamping mechanism holds the first cross beam.

Such configuration can reduce a friction force generated between the pressing mechanism and the sliding mechanism during the sliding process.

In the testing device according to one embodiment of the present application, the pressing mechanism further comprises a fourth clamping mechanism, a first end of the fourth clamping mechanism is fixedly connected to the second clamping mechanism, and a second end of the four clamping mechanism is fixedly connected to the second clamping mechanism; and wherein the fourth clamping mechanism is threadedly connected to the screw rod.

Such configuration can accurately guiding movement of the pressing mechanism during the sliding process.

In the testing device according to one embodiment of the present application, the transmission mechanism comprises a rotating arm, a rotating shaft, a first gear member, a second gear member, a third gear member, a chain, and a tray; the tray is fixed to the fixing frame; the first gear member and the second gear member are both disposed on the tray, and the third gear member is fixedly connected to the screw rod; and a first end of the rotating shaft is fixedly connected to the rotating arm, and a second end of the rotating shaft is fixedly connected to the first gear member;

wherein the first gear member, the second gear member, and the third gear member are connected and driven by the chain, an engagement direction of the first gear member with the chain is same as an engagement direction of the third gear member with the chain, and an engagement direction of the second gear member with the chain is opposite to the engagement direction of the third gear member with the chain.

Such configuration can realize accurate and efficient transmission of the transmission mechanism.

In the testing device according to one embodiment of the present application, a gear radius of the first gear member is greater than a gear radius of the second gear member, and the gear radius of the second gear member is same as a gear radius of the third gear member.

Such configuration enables an operator to rotate the screw rod by using the rotating arm in a more labor-saving manner.

The present application further provides a testing device, for testing material parameters of a plurality of substrates to be tested, wherein the testing device comprises: a box, a pressing mechanism, a sliding mechanism, a transmission mechanism, and a plurality of first clamping mechanisms.

The box comprises a base. The pressing mechanism is disposed inside the box. A gap between the pressing mechanism and a first side of the box is configured for placing the plurality of substrates to be tested. The sliding mechanism is arranged on the base. The pressing mechanism is slidably connected to the sliding mechanism. The transmission mechanism is connected to the pressing mechanism to drive movement of the pressing mechanism. Each of the first clamping mechanisms comprises a first clamping member and a second clamping member disposed opposite to the first clamping member. Each first clamping member is located on the first side of the box, each second clamping member is located on the pressing mechanism, each first clamping member is configured to hold a first end of one of the substrates to be tested, and each second clamping member is configured to hold a second end of one of the substrates to be tested.

The above-mentioned testing device clamps the substrates to be tested simultaneously through the first clamping mechanisms. At the same time, the pressing mechanism is movably connected to the transmission mechanism, so that the pressing mechanism slides on the sliding mechanism and can simultaneously press and bend the substrates to be tested, thereby being able to adjust arch heights of the substrates to be tested, achieve equal and stable deformation of the substrates to be tested. The pressing mechanism is driven by the transmission mechanism through a screw rod. Such a design can increase a transmission ratio of the testing device, realizing a more compact structure of the testing device.

In the testing device according to one embodiment of the present application, each first clamping member and each second clamping member are both an L-shaped curved side clip, and a convex direction of a curved surface of the L-shaped curved side clip is opposite to a bending direction of a panel to be tested.

Such configuration can effectively reduce a contact surface stress between the first clamping member and the substrate to be tested.

In the testing device according to one embodiment of the present application, a curvature of the curved surface of each L-shaped curved side clip is greater than a curvature of the corresponding substrate to be tested.

Such configuration can prevent one end of the substrate contacting the L-shaped curved side clamp from detaching due to excessive bending angles.

In the testing device according to one embodiment of the present application, the base is welded with a first support column close to the first side of the box, and the base is welded with a second support column close to a second side of the box, a first cross beam is disposed at a top of the base, and the first support column and the second support column are fixedly connected to the first cross beam;

wherein the base is further welded with a third support column, the third support column is arranged between the first support column and the second support column, and the third support column is fixedly connected to the first cross beam.

Such an arrangement can effectively improve structural stability of the testing device.

In the testing device according to one embodiment of the present application, a fixing frame is disposed between the second side of the box and the pressing mechanism, a first end of the sliding mechanism is fixed on the fixing frame, and a second end of the sliding mechanism penetrates the pressing mechanism and is fixed on the third support column.

Such an arrangement can fix the two ends of the sliding mechanism onto the box and avoid a displacement error of the pressing mechanism during a sliding process.

In the testing device according to one embodiment of the present application, the sliding mechanism comprises a sliding rail and a sliding rod, the sliding rail is fixed on the base, and the sliding rod is fixed on the sliding rail and exposes a track of the sliding rail.

Such an arrangement can improve stability of the pressing mechanism during the sliding process.

In the testing device according to one embodiment of the present application, the pressing mechanism comprises a second clamping mechanism and a third clamping mechanism, the second clamping mechanism is disposed on the sliding rail, the second clamping mechanism holds the sliding rod, two ends of the second clamping mechanism are engaged with the track of the sliding rail, and the third clamping mechanism holds the first cross beam.

Such configuration can reduce a friction force generated between the pressing mechanism and the sliding mechanism during the sliding process.

In the testing device according to one embodiment of the present application, the pressing mechanism further comprises a fourth clamping mechanism, a first end of the fourth clamping mechanism is fixedly connected to the second clamping mechanism, and a second end of the four clamping mechanism is fixedly connected to the second clamping mechanism; and wherein the fourth clamping mechanism is threadedly connected to the screw rod.

Such configuration can accurately guiding movement of the pressing mechanism during the sliding process.

In the testing device according to one embodiment of the present application, the transmission mechanism comprises a rotating arm, a rotating shaft, a first gear member, a second gear member, a third gear member, a chain, and a tray; the tray is fixed to the fixing frame; the first gear member and the second gear member are both disposed on the tray, and the third gear member is fixedly connected to the screw rod; and a first end of the rotating shaft is fixedly connected to the rotating arm, and a second end of the rotating shaft is fixedly connected to the first gear member;

wherein the first gear member, the second gear member, and the third gear member are connected and driven by the chain, an engagement direction of the first gear member with the chain is same as an engagement direction of the third gear member with the chain, and an engagement direction of the second gear member with the chain is opposite to the engagement direction of the third gear member with the chain.

Such configuration can realize accurate and efficient transmission of the transmission mechanism.

In the testing device according to one embodiment of the present application, a gear radius of the first gear member is greater than a gear radius of the second gear member, and the gear radius of the second gear member is same as a gear radius of the third gear member.

Such configuration enables an operator to rotate the screw rod by using the rotating arm in a more labor-saving manner.

Advantages of the Present Application

The present application provides a testing device for testing the material parameters of the substrate to be tested. The testing device comprises: a box, a pressing mechanism, a sliding mechanism, a transmission mechanism, and a plurality of first clamping mechanisms. The box comprises a base. The pressing mechanism is located inside the box. A plurality of substrates to be tested are disposed in a gap between the pressing mechanism and a first side of the box. The sliding mechanism is disposed on the base. The pressing mechanism 20 is slidably connected to the sliding mechanism. The transmission mechanism is connected to the pressing mechanism to drive movement of the pressing mechanism. Each of the first clamping mechanisms comprises a first clamping member and a second clamping member disposed opposite to the first clamping member. The first clamping member is disposed on a first side of the box. The second clamping member is located on the pressing mechanism. The first clamping member is used to hold a first end of the substrate to be tested, and the second clamping member is used to hold a second end of the substrate to be tested. The above-mentioned testing device clamps the substrates to be tested simultaneously through the first clamping mechanisms. At the same time, the pressing mechanism is movably connected to the transmission mechanism, so that the pressing mechanism slides on the sliding mechanism and can simultaneously press and bend the substrates to be tested, thereby being able to adjust arch heights of the substrates to be tested, achieve equal and stable deformation of the substrates to be tested, and then calculate effective inspection stresses of the substrates to be tested through Weibull distribution parameters, thus further reducing a risk of fragmentation of the substrates to be tested.

DETAILED DESCRIPTION OF EMBODIMENTS

Figure 1:
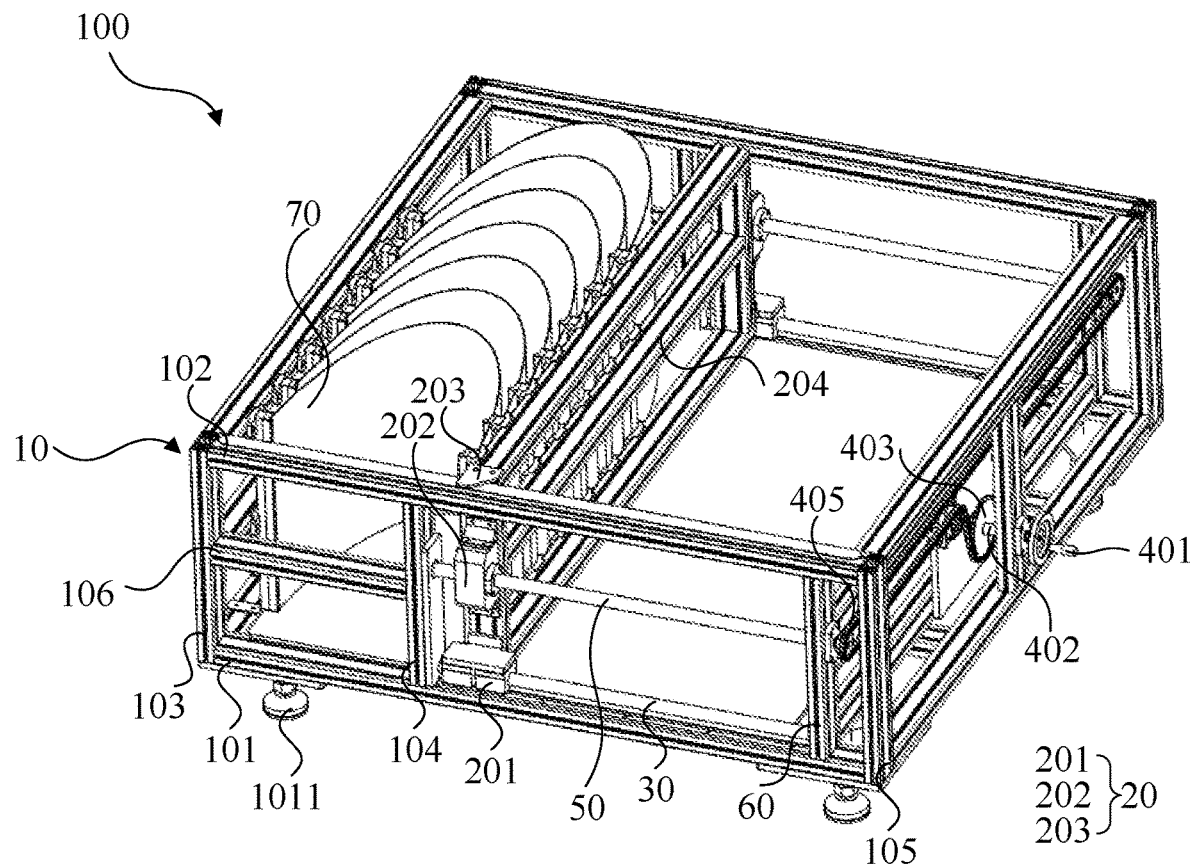
FIG. 1 is an axonometric view illustrating a testing device according to one embodiment of the present application.

The present application solves a technical problem that conventional testing devices cannot accurately measure material parameters of curved products. The present application can improve the above technical problem.

Please refer to FIGS. 1 to 6. The present application provides a testing device 100, for testing material parameters of a plurality of substrates 70 to be tested, wherein the testing device 100 comprises: a box 10, a pressing mechanism 20, a sliding mechanism 30, a transmission mechanism 40, and a plurality of first clamping mechanisms 205. The box 10 comprises a base 101. The pressing mechanism 20 is disposed inside the box 10 and parallel to two side surfaces of the box. A gap between the pressing mechanism 20 and a first side of the box 10 is configured for placing the plurality of substrates 70 to be tested. The sliding mechanism 30 is arranged on the base 101. A first end of the pressing mechanism 20 is slidably connected to the sliding mechanism 30. Each of the first clamping mechanisms 205 comprises a first clamping member 2051 and a second clamping member 2052 disposed opposite to the first clamping member 2051. Each first clamping member 2051 is located on the first side of the box 10, each second clamping member 2052 is located on the pressing mechanism 20, each first clamping member 2051 is configured to hold a first end of one of the substrates 70 to be tested, and each second clamping member 2052 is configured to hold a second end of one of the substrates 70 to be tested.

The transmission mechanism 40 is disposed between the second side of the box 10 and the pressing mechanism 20. The second side is opposite to the first side. The transmission mechanism 40 is connected to the pressing mechanism 20 for driving the pressing mechanism 20 to move.

The above-mentioned testing device clamps the substrates 70 to be tested simultaneously by using the first clamping mechanisms 205. At the same time, the pressing mechanism 20 is movably connected to the transmission mechanism 40, so that the pressing mechanism 20 slides on the sliding mechanism 30 and can simultaneously press and bend the substrates 70 to be tested, thereby being able to adjust arch heights of the substrates 70 to be tested, realizing equal and stable deformation of the substrates 70 to be tested, and then calculating effective inspection stress of the substrates 70 to be tested through Weibull distribution parameters, which further reducing a risk of fragmentation of the substrates 70 to be tested.

The technical solution of the present application will now be described in conjunction with specific embodiments.

As shown in FIG. 1, it is an axonometric view of the testing device 100 according to one embodiment of the present application. The testing device 100 comprises: a box 10, a pressing mechanism 20, a sliding mechanism 30, and a transmission mechanism 40. The pressing mechanism 20 is arranged in the box 10. The sliding mechanism 30 is arranged at a first front side and a first rear side of the box 10 corresponding to the first front side. The transmission mechanism 40 is connected to the pressing mechanism 20 for driving the pressing mechanism 20 to move.

The transmission mechanism 40 is disposed on a first side of the box 10, and the first side is disposed between the first front side and the first rear side.

In the present application, the pressing mechanism 20 is driven by the transmission mechanism 40 through a screw rod 50. Such a design can increase a transmission ratio of the testing device 100, realizing a more compact structure of the testing device 100.

In the present application, the box 10 comprises a base 101, a first support column 103 is welded on the base 101 close to the first side of the box 10, and a second support column 105 is welded on the base 101 close to the second side of the box 10. A first cross beam 102 is disposed at a top of the base 101, and the first support column 103 and the second support column 105 are fixedly connected to the first cross beam 102.

A third support column 104 is welded on the base 101, the third support column 104 is arranged between the first support column 103 and the second support column 105, and the third support column 104 is fixedly connected to the first cross beam 102. Such an arrangement can effectively improve structural stability of the testing device 100.

In the present application, a fixing frame 60 is disposed between the second side of the box 10 and the pressing mechanism 20. A first end of the sliding mechanism 30 is fixed on the fixing frame 60. A second end of the sliding mechanism 30 penetrates the pressing mechanism 20 and is fixed on the third support column 104. This arrangement can fix the two ends of the sliding mechanism 30 onto the box 10 and avoid a displacement error of the pressing mechanism 20 during a sliding process.

Further, the sliding mechanism 30 comprises a sliding rail and a sliding rod. The sliding rail is fixed on the base 101, and the sliding rod is fixed on the sliding rail and exposes a track of the sliding rail. The sliding rail and the sliding rod are an integrally formed structure. Such an arrangement can improve stability of the pressing mechanism 20 during the sliding process.

In the present application, the pressing mechanism 20 is located inside the box 10 and arranged in parallel to the two sides of the box 10. The substrates 70 to be tested are placed between the pressing mechanism 20 and the first side of the box 10. The pressing mechanism 20 comprises a first pressing portion, a first connection rod 204, and a second pressing portion. The first pressing portion, the first connecting rod 204, and the second pressing portion are fixedly connected. The first pressing portion is disposed at the first front side, the second pressing portion is disposed at the first rear side, and the connecting rod 204 is arranged parallel to the first side or the second side.

In the present application, the first pressing portion or the second pressing portion comprises a second clamping mechanism 201, a third clamping mechanism 203, and a fourth clamping mechanism 202. The second clamping mechanism 201 and the third clamping mechanism 203 are fixedly connected to the fourth clamping mechanism 202. The second clamping mechanism 201 is disposed on the base 101, and the third clamping mechanism 203 is disposed on one side of the cross beam. The fourth clamping mechanism 202 is disposed between the second clamping mechanism 201 and the third clamping mechanism 203. The screw rod 50 penetrates the fourth clamping mechanism 202, and the screw rod 50 is threadedly connected to the fourth clamping mechanism 202. Such configuration can reduce a friction force generated between the pressing mechanism 20 and the sliding mechanism during the sliding process, and at the same time can accurately guiding movement of the pressing mechanism during the sliding process. A length of a first threaded portion on the screw rod 50 is greater than a length of a second threaded portion on the fourth clamping mechanism 202. Such configuration is to enable the fourth clamping mechanism 202 to slide a certain distance on the first threaded portion.

Furthermore, a gap between the pressing mechanism 20 and the first side of the box 10 is used to place the substrates 70 to be tested. A second cross beam 106 is fixed between the third support column 104 and the first support column 103. A length of the second cross beam 106 is less than a length of each substrate 70 to be tested. Such configuration is to enable the testing device 100 to change a stepped stress on the substrates 70 to be tested by moving the pressing mechanism 20.

In the present application, the second clamping mechanism 201 clamps the sliding rod, and two ends of the second clamping mechanism 201 are engaged with the sliding rail. Preferably, the second clamping mechanism 201 is a first rectangular slider, the first rectangular slider has a first hollow portion, the first hollow portion exposes the sliding rail, and the sliding rod passes through the first hollow portion.

In the present application, a pad 1021 is disposed on a side surface of the cross beam away from the base 101, and the pad 1021 completely covers the first cross beam 102. The third clamping mechanism 203 clamps the first cross beam 102 and slides on the pad 1021. Preferably, the third clamping mechanism 203 is a groove structure, the first cross beam 102 passes through the groove structure, and a first end of the groove structure is fixedly connected to the fourth clamping mechanism 202. A second end of the groove structure is provided with a first baffle, and the first baffle slides on the pad 1021.

In the present application, the screw rod 50 is inserted through and threadedly connected to the fourth clamping mechanism 202. The fourth clamping mechanism 202 is preferably a second rectangular slider. The second rectangular slider comprises a second hollow portion, and the second hollow portion is located at a center of the second rectangular slider. A second threaded portion is arranged in the second hollow portion, and the screw rod 50 passes through the second hollow portion and is threadedly connected to the third clamping mechanism through the second threaded portion.

Figure 2:
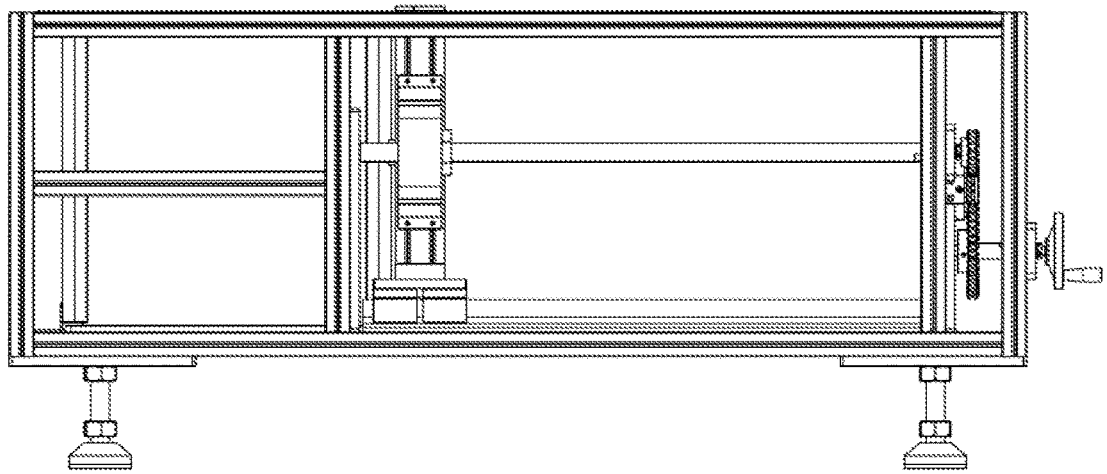
FIG. 2 is a front view of the testing device according to one embodiment of the present application.
Figure 3:
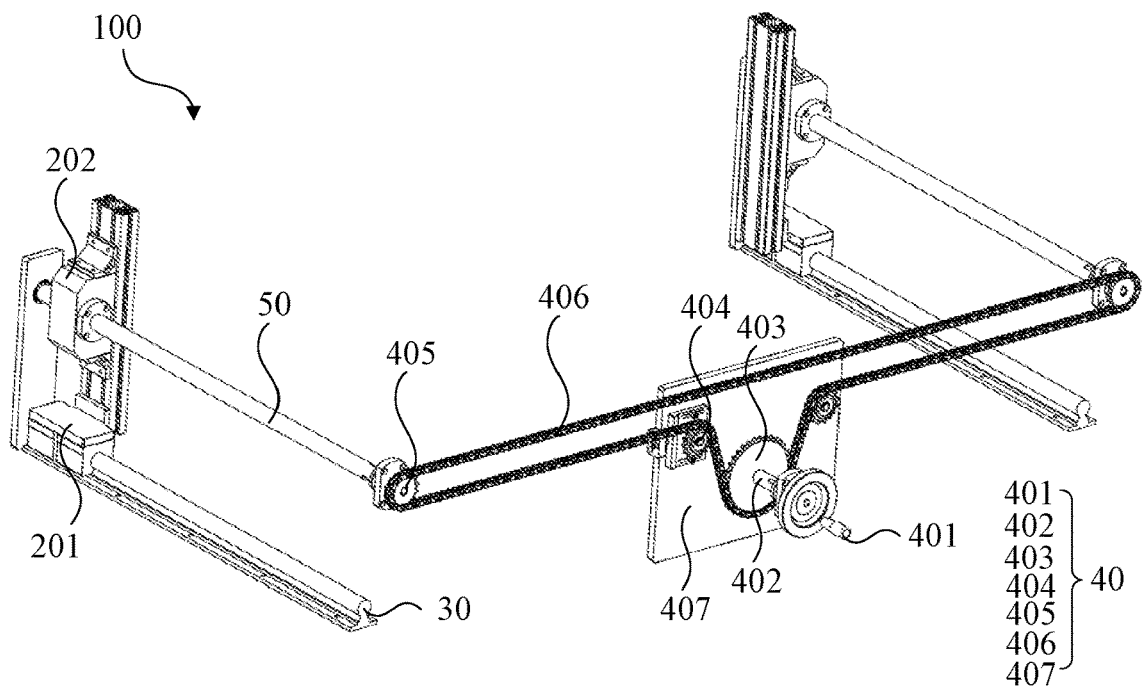
FIG. 3 is a schematic assembly view of a transmission mechanism in the testing device provided by the embodiment of the application.

Please refer to FIG. 2, which is a front view of the testing device 100 according to one embodiment of the present application. Please refer to FIG. 3, which is a schematic assembly view of the transmission mechanism 40 in the testing device 100 according to one embodiment of the present application. Referring to FIGS. 1, 2, and 3 in combination, the transmission mechanism 40 comprises a rotating arm 401, a rotating shaft 402, a first gear member 403, a second gear member 404, a third gear member 405, a chain 406, and a tray 407. The tray 407 is fixed to the fixing frame 60. The first gear member 403 and the second gear member 404 are both disposed on the tray 407. The third gear member 405 is fixedly connected to the screw rod 50. A first end of the rotating shaft 402 is fixedly connected to the rotating arm 401, and a second end of the rotating shaft 402 is fixedly connected to the first gear member 403.

The first gear member 403, the second gear member 404, and the third gear member 405 are connected and driven by the chain 406. An engagement direction of the first gear member 403 with the chain 406 is same as an engagement direction of the third gear member 405 with the chain 406. An engagement direction of the second gear member 404 with the chain 406 is opposite to the engagement direction of the third gear member 405 with the chain 406. Such configuration can realize accurate and efficient transmission of the transmission mechanism 40. In the present embodiment, the first gear member 403 comprises one gear, while both the second gear member 404 and the third gear member 405 include two gears.

Further, a gear radius of the first gear member 403 is greater than a gear radius of the second gear member 404. The gear radius of the second gear member 404 is the same as a gear radius of the third gear member 405. Such configuration enables an operator to rotate the screw rod 50 by using the rotating arm 401 in a more labor-saving manner.

Figure 4:
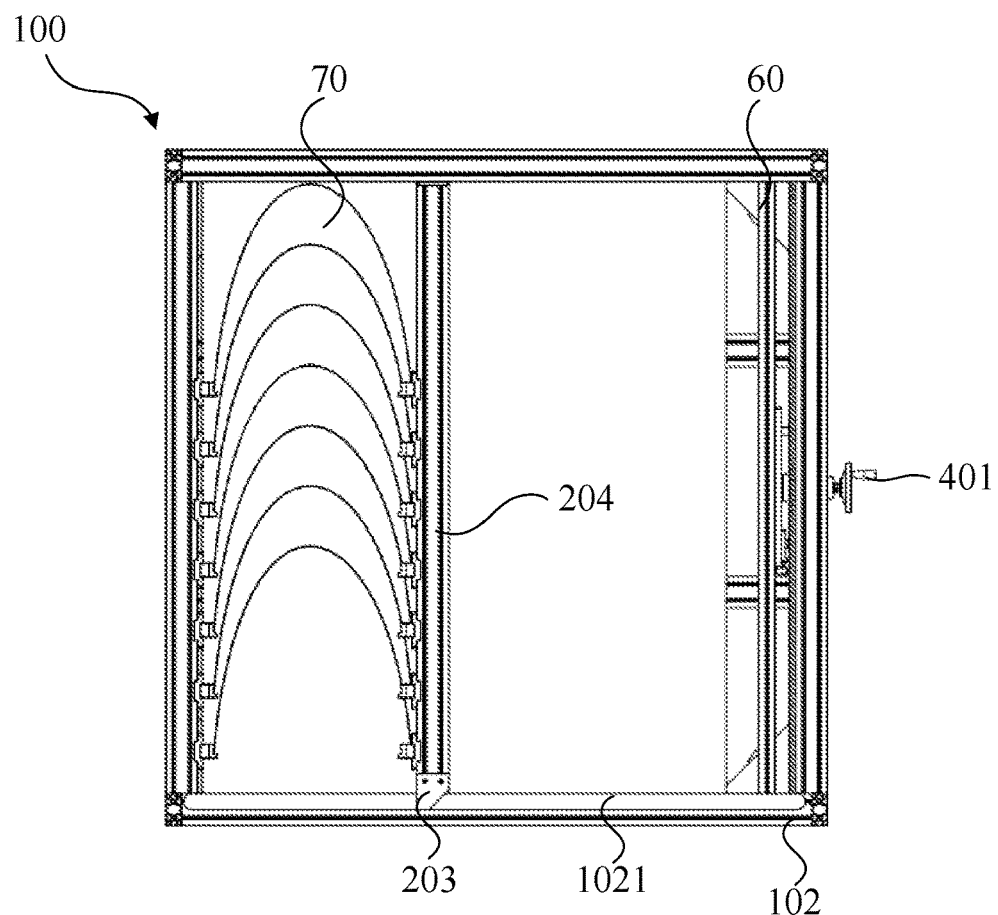
FIG. 4 is a top view of the testing device according to one embodiment of the present application.

As shown in FIG. 4, it is a top view of the testing device 100 according to one embodiment of the present application. The gap between the pressing mechanism 20 and the first side of the box 10 is used to place the substrates 70 to be tested.

Specifically, the first side and the pressing mechanism 20 are provided with the first clamping mechanisms 205. Each of the first clamping mechanism 205 is arranged in parallel with the third support column 104, and the substrates 70 to be tested are fixed inside the box 10 by means of the first clamping mechanisms 205. Each substrate 70 to be tested has the same curvature and the same size.

Figure 5:
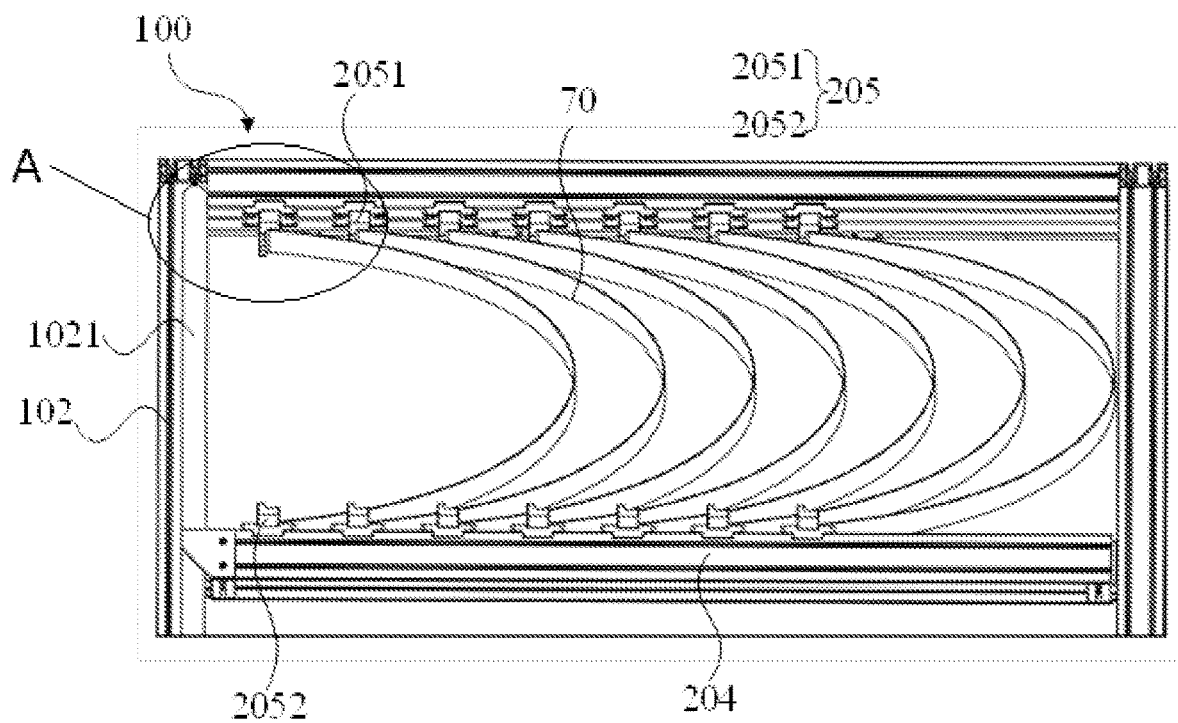
FIG. 5 is a schematic structural view showing a contact portion between a substrate to be tested and a first clamping mechanism in the testing device according to one embodiment of the present application.

As shown in FIG. 5, it is a schematic structural view showing a contact portion between the substrate 70 to be tested and the first clamping mechanism 205 in the testing device 100 according to one embodiment of the present application.

Each of the first clamping mechanisms 205 comprises a first clamping member 2051 and a second clamping member 2052 disposed opposite to the first clamping member 2051. Each first clamping member 2051 is located on the first side of the box 10, each second clamping member 2052 is located on the pressing mechanism 20, and each first clamping member 2051 is used to hold a first end of one of the substrates 70 to be tested. Each second clamping member 2052 is used to hold a second end of one of the substrates 70 to be tested.

Figure 6:
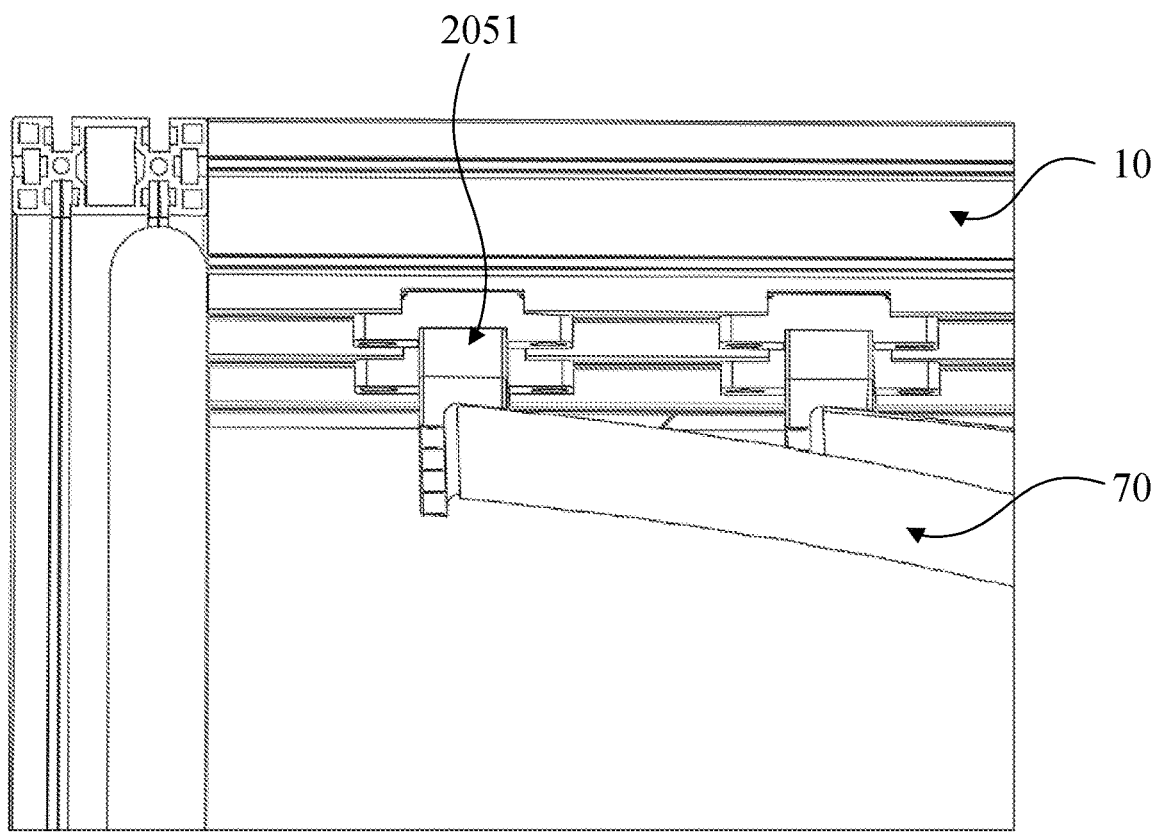
FIG. 6 is an enlarged view showing part A in FIG. 5.

As shown in FIG. 6, it is an enlarged view of part A in FIG. 5. The first clamping member 2051 is an L-shaped curved side clip, and a convex direction of a curved surface of the L-shaped curved side clip is opposite to a bending direction of the substrate 70 to be tested.

Such configuration can effectively reduce a contact surface stress between the first clamping member 2051 and the substrate 70 to be tested.

Preferably, each second clamping member 2052 is an L-shaped curved side clip.

Further, a curvature of the curved surface of the L-shaped curved side clip is much greater than a curvature of the substrate 70 to be tested. Such configuration can prevent one end of the substrate 70 contacting the L-shaped curved side clamp from detaching due to excessive bending angles.

According to the foregoing embodiments of the present application, the testing principles of the testing device 100 of the present application are as follows:

First, the substrates 70 with the same curvature and the same size are provided. Then, an operator rotates the rotating shaft 402 through the rotating arm 401, and the rotating shaft 402 drives the first gear member 403 to rotate in a first direction (at this point, the pressing mechanism 20 moves in a direction toward the third support column 104). The first gear member 403 simultaneously drives the second gear member 404 to rotate in a second direction opposite to the first direction by means of the chain 406. The second gear member 404 drives the third gear member 405 to rotate in the first direction by means of the chain 406. Since the third gear member 405 is fixedly connected to the screw rod 50, rotation of the third gear member 405 drives the screw rod 50 to rotate, and the rotation of the screw rod 50 drives the fourth clamping mechanism 202 to slide on the first threaded portion of the screw rod 50. The fourth clamping mechanism 202 slides and drives the second clamping mechanism 201 to slide in the same direction on the sliding rail, and at the same time drives the third clamping mechanism 203 to slide in the same direction on the pad 1021.

When a distance between the pressing mechanism 20 and the first side is exactly equal to a length of the substrate 70 to be tested, multiple substrates 70 to be tested 70 are placed in the gap formed between the pressing mechanism 20 and the first side. The first side and the fourth clamping member 205 of the pressing mechanism 20 clamp the substrates 70 to be tested. After that, the rotating shaft 402 is rotated by the rotating arm 401, so that the pressing mechanism 20 moves toward the first side to bend the substrates 70 to be tested until the substrates 70 to be tested fragment under a certain amount of bending stress. At this point, the material parameters of the substrate 70 to be tested under different stepped stresses can be obtained by the testing device 100.

The testing device 100 of the present application can achieve equal and stable deformation of the substrates 70 to be tested, and can also cause simultaneous equal bending of the substrates 70 to be tested having the same size. On the other hand, the testing device 100 adopts the L-shaped curved side clips for the first clamping mechanism 205, which can effectively reduce a contact surface stress between the substrate to be tested 70 and the L-shaped curved side clips.

In order to solve a technical problem that conventional testing devices cannot obtain material parameters of curved products, the present application provides a testing device 100 for testing the material parameters of the substrate 70 to be tested. The testing device 100 comprises: a box 10, a pressing mechanism 20, a sliding mechanism 30, a transmission mechanism 40, and a plurality of first clamping mechanisms 205. The box 10 comprises a base 101. The pressing mechanism 20 is located inside the box 10 and is parallel to two sides of the box 10. A plurality of substrates 70 to be tested are disposed in a gap between the pressing mechanism 20 and a first side of the box 10. The sliding mechanism 30 is disposed on the base 101. A first end of the pressing mechanism 20 is slidably connected to the sliding mechanism 30. The transmission mechanism 40 is located between a second side of the box 10 and the pressing mechanism 20. The second side is opposite to the first side. Each of the first clamping mechanisms 205 comprises a first clamping member 2051 and a second clamping member 2052 disposed opposite to the first clamping member 2051. The first clamping member 2051 is disposed on the first side of the box 10. The second clamping member 2052 is located on the pressing mechanism 20. The first clamping member 2051 is used to hold a first end of the substrate 70 to be tested, and the second clamping member 2052 is used to hold a second end of the substrate 70 to be tested. The pressing mechanism 20 is movably connected to the transmission mechanism 40. The above-mentioned testing device clamps the substrates 70 to be tested simultaneously through the first clamping mechanisms 205. At the same time, the pressing mechanism 20 is movably connected to the transmission mechanism 40, so that the pressing mechanism 20 slides on the sliding mechanism 30 and can simultaneously press and bend the substrates 70 to be tested, thereby being able to adjust arch heights of the substrates 70 to be tested, achieve equal and stable deformation of the substrates to be tested 70, and then calculate effective inspection stresses of the substrates 70 to be tested through Weibull distribution parameters, thus further reducing a risk of fragmentation of the substrates 70 to be tested.

Figure 7:
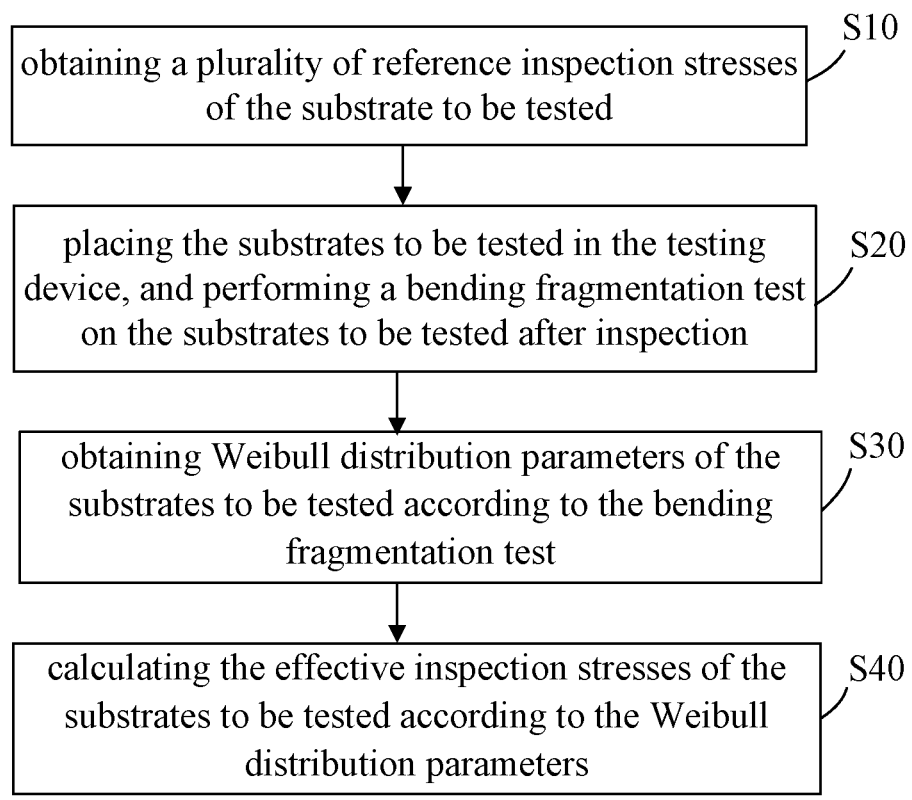
FIG. 7 is a process flow diagram illustrating a method for batch testing inspection stresses of the substrates to be tested according to one embodiment of the present application.

As shown in FIG. 7, it is a process flow diagram illustrating of a method for batch testing the inspection stresses of the substrates 70 to be tested according to one embodiment of the present application. The method comprises:

step S10: obtaining a plurality of reference inspection stresses of the substrate 70 to be tested.

Specifically, step S10 further comprises:

determining the reference inspection stresses according to curvature specifications of the substrates 70 to be tested. The reference inspection stresses are reference stresses for performing a stepped stress fragmentation test. Since it is not clear what an ultimate stress is when the substrate 70 to be tested is fragmented, it is necessary to calculate the reference inspection stresses to perform the stepped stress fragmentation test.

step S20: placing the substrates 70 to be tested in the testing device 100, and performing a bending fragmentation test on the substrates to be tested 70 after inspection.

Specifically, step S20 further comprises:

First, rotating a rotating arm 401 to move the pressing mechanism 20. Then, placing the substrates 70 to be tested in the testing device 100. Then, moving the pressing mechanism 20 according to each reference inspection stress, so that the substrates 70 to be tested are simultaneously, equally, and stably deformed under the same reference inspection stress, so as to determine material parameters of the substrates 70 to be tested under this reference inspection stress.

step S30: obtaining Weibull distribution parameters of the substrates 70 to be tested according to the bending fragmentation test.

Specifically, step S30 further comprises:

obtaining the material parameters of the substrate 70 to be tested according to the bending fragmentation test; then, determining the Weibull distribution parameters of the substrates 70 to be tested according to the bending fragmentation test. The Weibull distribution which represents a probability of breaking the substrates 70 to be tested under a given stress is most often used to express a strength of the glass. In more common two-parameter Weibull distribution, a probability of failure can be expressed by the following formula 1:

$$P_f = 1 - \exp[-(\sigma_{max}/\sigma_0)^m]$$

$P_f$ is the probability of failure, $\sigma_{max}$ is a maximum bending stress when the test sample fails, $\sigma_0$ is a Weibull characteristic strength corresponding to $P_f = 63\%$, and m is a Weibull modulus. Two parameters m and $\sigma_0$ are experimentally determined by applying stress to the substrate 70 to be tested until fragmentation (failure) occurs. $\sigma_0$ is the stress measured by the stepped stress test to make the fragmentation occur with the above-mentioned probability. The Weibull modulus $\sigma_0$ provides a statistical measure of the surrounding spread distribution. By measuring the stress when multiple samples fail, the failure probability (and Weibull parameters $\sigma_0$ and m) can be determined.

step S40: calculating the effective inspection stresses of the substrates 70 to be tested according to the Weibull distribution parameters.

Specifically, step S40 further comprises:

calculating the effective inspection stress of the substrate 70 to be tested according to the Weibull distribution parameters, wherein the failure probability of the substrate 70 to be tested under each reference inspection stress can be determined by the Weibull distribution parameters, thereby calculating the effective inspection stress of the substrate 70 to be tested.

The present application provides a testing device 100 for testing the material parameters of the substrate 70 to be tested. The testing device 100 comprises: a box 10, a pressing mechanism 20, a sliding mechanism 30, a transmission mechanism 40, and a plurality of first clamping mechanisms 205. The box 10 comprises a base 101. The pressing mechanism 20 is located inside the box 10 and is parallel to two sides of the box 10. A plurality of substrates 70 to be tested are disposed in a gap between the pressing mechanism 20 and a first side of the box 10. The sliding mechanism 30 is disposed on the base 101. A first end of the pressing mechanism 20 is slidably connected to the sliding mechanism 30. Each of the first clamping mechanisms 205 comprises a first clamping member 2051 and a second clamping member 2052 disposed opposite to the first clamping member 2051. The first clamping member 2051 is disposed on a first side of the box 10. The second clamping member 2052 is located on the pressing mechanism 20. The first clamping member 2051 is used to hold a first end of the substrate 70 to be tested, and the second clamping member 2052 is used to hold a second end of the substrate 70 to be tested. The transmission mechanism 40 is located between a second side of the box 10 and the pressing mechanism 20, and the second side is disposed opposite to the first side. The transmission mechanism 40 is connected to the pressing mechanism 20 to drive movement of the pressing mechanism 20. The above-mentioned testing device clamps the substrates 70 to be tested simultaneously through the first clamping mechanisms 205. At the same time, the pressing mechanism 20 is movably connected to the transmission mechanism 40, so that the pressing mechanism 20 slides on the sliding mechanism 30 and can simultaneously press and bend the substrates 70 to be tested, thereby being able to adjust arch heights of the substrates 70 to be tested 70, achieve equal and stable deformation of the substrates to be tested 70, and then calculate effective inspection stresses of the substrates 70 to be tested through Weibull distribution parameters, thus further reducing a risk of fragmentation of the substrates 70 to be tested.

In the above-mentioned embodiments, the description of each embodiment has its own emphasis. For those that are not described in detail in one embodiment, reference may be made to related descriptions of other embodiments.

The testing device 100 of the present application is described in detail above. Specific examples are used in the present disclosure to describe the principle and embodiments of the present application. The description of the above embodiments is only for ease of understanding the method and main ideas of the present application. Based on the ideas of the present application, those skilled in the art can change the embodiments and protection scope of the present application. In summary, the content of the present specification should not be construed as a limitation to the present application.

What is claimed is:

1. A testing device, for testing material parameters of a plurality of substrates to be tested, wherein the testing device comprises:
 a box comprising a base;
 a pressing mechanism disposed inside the box, wherein a gap between the pressing mechanism and a first side of the box is configured for placing the plurality of substrates to be tested;
 a sliding mechanism arranged on the base, wherein the pressing mechanism is slidably connected to the sliding mechanism; and
 a transmission mechanism connected to the pressing mechanism and configured for driving the pressing mechanism to move; and
 a plurality of first clamping mechanisms, wherein each of the first clamping mechanisms comprises a first clamping member and a second clamping member disposed opposite to the first clamping member, and each first clamping member is located on the first side of the box, each second clamping member is located on the pressing mechanism, each first clamping member is configured to hold a first end of one of the substrates to be tested, and each second clamping member is configured to hold a second end of one of the substrates to be tested;
 wherein the pressing mechanism is driven by the transmission mechanism through a screw rod.

2. The testing device according to claim 1, wherein each first clamping member and each second clamping member are both an L-shaped curved side clip, and a convex direction of a curved surface of the L-shaped curved side clip is opposite to a bending direction of a panel to be tested.

3. The testing device according to claim 2, wherein a curvature of the curved surface of each L-shaped curved side clip is greater than a curvature of the corresponding substrate to be tested.

4. The testing device according to claim 1, wherein the base is welded with a first support column close to the first side of the box, and the base is welded with a second support column close to a second side of the box, a first cross beam is disposed at a top of the base, and the first support column and the second support column are fixedly connected to the first cross beam;
 wherein the base is further welded with a third support column, the third support column is arranged between the first support column and the second support column, and the third support column is fixedly connected to the first cross beam.

5. The testing device according to claim 4, wherein a fixing frame is disposed between the second side of the box and the pressing mechanism, a first end of the sliding mechanism is fixed on the fixing frame, and a second end of the sliding mechanism penetrates the pressing mechanism and is fixed on the third support column.

6. The testing device according to claim 5, wherein the sliding mechanism comprises a sliding rail and a sliding rod, the sliding rail is fixed on the base, and the sliding rod is fixed on the sliding rail and exposes a track of the sliding rail.

7. The testing device according to claim 5, wherein the pressing mechanism comprises a second clamping mechanism and a third clamping mechanism, the second clamping mechanism is disposed on the sliding rail, the second clamping mechanism holds the sliding rod, two ends of the second clamping mechanism are engaged with the track of the sliding rail, and the third clamping mechanism holds the first cross beam.

8. The testing device according to claim 7, wherein the pressing mechanism further comprises a fourth clamping mechanism, a first end of the fourth clamping mechanism is fixedly connected to the second clamping mechanism, and a second end of the four clamping mechanism is fixedly connected to the second clamping mechanism; and
 wherein the fourth clamping mechanism is threadedly connected to the screw rod.

9. The testing device according to claim 5, wherein the transmission mechanism comprises a rotating arm, a rotating shaft, a first gear member, a second gear member, a third gear member, a chain, and a tray; the tray is fixed to the fixing frame; the first gear member and the second gear member are both disposed on the tray, and the third gear member is fixedly connected to the screw rod; and a first end of the rotating shaft is fixedly connected to the rotating arm, and a second end of the rotating shaft is fixedly connected to the first gear member;
 wherein the first gear member, the second gear member, and the third gear member are connected and driven by the chain, an engagement direction of the first gear member with the chain is same as an engagement direction of the third gear member with the chain, and an engagement direction of the second gear member with the chain is opposite to the engagement direction of the third gear member with the chain.

10. The testing device according to claim 9, wherein a gear radius of the first gear member is greater than a gear radius of the second gear member, and the gear radius of the second gear member is same as a gear radius of the third gear member.

11. A testing device, for testing material parameters of a plurality of substrates to be tested, wherein the testing device comprises:
 a box comprising a base;
 a pressing mechanism located inside the box, wherein a gap between the pressing mechanism and a first side of the box is configured for placing the plurality of substrates to be tested;
 a sliding mechanism arranged on the base, wherein the pressing mechanism is slidably connected to the sliding mechanism; and
 a transmission mechanism connected to the pressing mechanism and configured for driving the pressing mechanism to move; and
 a plurality of first clamping mechanisms, wherein each of the first clamping mechanisms comprises a first clamping member and a second clamping member disposed opposite to the first clamping member, and each first clamping member is located on the first side of the box, each second clamping member is located on the pressing mechanism, each first clamping member is configured to hold a first end of one of the substrates to be tested, and each second clamping member is configured to hold a second end of one of the substrates to be tested.

12. The testing device according to claim 11, wherein each first clamping member and each second clamping member are both an L-shaped curved side clip, and a convex direction of a curved surface of the L-shaped curved side clip is opposite to a bending direction of a panel to be tested.

13. The testing device according to claim 12, wherein a curvature of the curved surface of each L-shaped curved side clip is greater than a curvature of the corresponding substrate to be tested.

14. The testing device according to claim 11, wherein the base is welded with a first support column close to the first side of the box, and the base is welded with a second support column close to a second side of the box, a first cross beam is disposed at a top of the base, and the first support column and the second support column are fixedly connected to the first cross beam;

wherein the base is further welded with a third support column, the third support column is arranged between the first support column and the second support column, and the third support column is fixedly connected to the first cross beam.

15. The testing device according to claim 14, wherein a fixing frame is disposed between the second side of the box and the pressing mechanism, a first end of the sliding mechanism is fixed on the fixing frame, and a second end of the sliding mechanism penetrates the pressing mechanism and is fixed on the third support column.

16. The testing device according to claim 15, wherein the sliding mechanism comprises a sliding rail and a sliding rod, the sliding rail is fixed on the base, and the sliding rod is fixed on the sliding rail and exposes a track of the sliding rail.

17. The testing device according to claim 15, wherein the pressing mechanism comprises a second clamping mechanism and a third clamping mechanism, the second clamping mechanism is disposed on the sliding rail, the second clamping mechanism holds the sliding rod, two ends of the second clamping mechanism are engaged with the track of the sliding rail, and the third clamping mechanism holds the first cross beam.

18. The testing device according to claim 17, wherein the pressing mechanism further comprises a fourth clamping mechanism, a first end of the fourth clamping mechanism is fixedly connected to the second clamping mechanism, and a second end of the four clamping mechanism is fixedly connected to the second clamping mechanism; and wherein the fourth clamping mechanism is threadedly connected to the screw rod.

19. The testing device according to claim 15, wherein the transmission mechanism comprises a rotating arm, a rotating shaft, a first gear member, a second gear member, a third gear member, a chain, and a tray; the tray is fixed to the fixing frame; the first gear member and the second gear member are both disposed on the tray, and the third gear member is fixedly connected to the screw rod; and a first end of the rotating shaft is fixedly connected to the rotating arm, and a second end of the rotating shaft is fixedly connected to the first gear member;

wherein the first gear member, the second gear member, and the third gear member are connected and driven by the chain, an engagement direction of the first gear member with the chain is same as an engagement direction of the third gear member with the chain, and an engagement direction of the second gear member with the chain is opposite to the engagement direction of the third gear member with the chain.

20. The testing device according to claim 19, wherein a gear radius of the first gear member is greater than a gear radius of the second gear member, and the gear radius of the second gear member is same as a gear radius of the third gear member.

* * * * *